United States Patent
Uematsu

(10) Patent No.: US 9,438,158 B2
(45) Date of Patent: Sep. 6, 2016

(54) MOTOR CONTROL DEVICE CONTROLLING SYNCHRONOUS MOTOR

(71) Applicant: FANUC Corporation, Yamanashi (JP)

(72) Inventor: Hidetoshi Uematsu, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 14/609,494

(22) Filed: Jan. 30, 2015

(65) Prior Publication Data

US 2015/0249418 A1    Sep. 3, 2015

(30) Foreign Application Priority Data

Feb. 28, 2014 (JP) .................. 2014-038916

(51) Int. Cl.
*H02P 21/00* (2006.01)
*H02P 21/14* (2016.01)

(52) U.S. Cl.
CPC ............. *H02P 21/148* (2013.01); *H02P 21/22* (2016.02)

(58) Field of Classification Search
USPC ..................................... 318/400.02
See application file for complete search history.

(56) References Cited

U.S. PATENT DOCUMENTS

| | | | |
|---|---|---|---|
| 2005/0140329 A1* | 6/2005 | Ihm ............... | H02P 21/06 318/712 |
| 2006/0132082 A1* | 6/2006 | Ihm ............... | H02P 21/06 318/717 |
| 2010/0066283 A1* | 3/2010 | Kitanaka ............. | B60L 11/1803 318/400.02 |
| 2011/0241584 A1* | 10/2011 | He ............... | H02P 6/08 318/400.09 |
| 2013/0249449 A1* | 9/2013 | Uematsu ............. | H02P 21/0096 318/400.02 |

FOREIGN PATENT DOCUMENTS

| JP | H10-14299 A | 1/1998 |
|---|---|---|
| JP | 2000-092884 A | 3/2000 |
| JP | 2000-358400 A | 12/2000 |
| JP | 2000358400 A * | 12/2000 |
| JP | 2012-249459 A | 12/2012 |
| JP | 2013-085407 A | 5/2013 |
| JP | 2013-226033 A | 10/2013 |

OTHER PUBLICATIONS

Takeda, Y., et al., "Design and control of an embedded magnetic synchronous motor", Corporation Ohm, first edition, first issue, pp. 17-27 and 38-46, 2001.

* cited by examiner

*Primary Examiner* — Jorge L Carrasquillo
(74) *Attorney, Agent, or Firm* — Hauptman Ham, LLP

(57) ABSTRACT

A motor control device includes: a calculating unit for calculating a speed reference value that decreases as a torque command increases; a determining unit for determining a magnitude relationship between a speed command and a speed reference value calculated for a torque command by the calculating unit; a q-axis-current commanding unit for generating a q-axis current command on the basis of a torque command and an inverse number of a torque constant of the synchronous motor when a speed command is smaller than a speed reference value, and generating the q-axis current command on the basis of a function of which independent variable is a speed command, the torque command, the inverse number of the torque constant, and when a speed command is equal to or larger than a speed reference value; and a d-axis-current commanding unit generating a d-axis current command, on the basis of a q-axis current command.

3 Claims, 3 Drawing Sheets

MOTOR CONTROL DEVICE CONTROLLING SYNCHRONOUS MOTOR

RELATED APPLICATIONS

The present application claims priority to Japanese Application Number 2014-038916, filed Feb. 28, 2014, the disclosure of which is hereby incorporated by reference herein in its entirety.

BACKGROUND OF THE INVENTION

1. Field of the Invention

The present invention relates to a motor control device which performs current vector control on a synchronous motor, and in particular, relates to a motor control device performing a current vector control on a permanent magnetic synchronous motor (PMSM) possessing saliency, on the basis of a q-axis current command and a d-axis current command.

2. Description of the Related Art

As a control method for a three-phase alternating current synchronous motor (also referred to simply as "synchronous motor" in the following) including a permanent magnet, there is known current vector control using d-q coordinate control system, as described, for example, in the document: "Design and control of an embedded magnetic synchronous motor" by Youji Takeda, Nobuyuki Matsui, Shigeo Morimoto, and Yukio Honda, Corporation Ohm, first edition, first issue, pages 17 to 27 and pages 38 to 46, 2001. In the d-q coordinate control system, a direction (i.e., a center axis of a permanent magnet) of a magnetic pole of a rotor is set as a d axis, and an axis (an axis between the permanent magnets) electrically and magnetically perpendicular to the d axis is set as a q axis. In this case, from a torque command, a q-axis current command and a d-axis current command are generated, and the q-axis current command and the d-axis current command are used to make a current flow through an appropriate excitation-phase winding in accordance with a magnetic pole position of the rotor of the synchronous motor. Thereby, desired torque depending on a torque command is generated in the synchronous motor.

For example, as described in Japanese Laid-open Patent Publication No. 2013-226033, there is a motor control device that limits a q-axis current command in accordance with a torque command and a speed command, and calculates a d-axis command from the speed command and the q-axis current command so that a processing speed is made high without using a complicated calculation equation.

Further, for example, as described in Japanese Laid-open Patent Publication No. 2012-249459, there is a motor control device in which inductance information, in which inductances of a d axis and a q axis changing in accordance with a value of a current flowing through a synchronous motor are related to a current value, is set in advance, and when current commands of the d-axis and the q-axis are generated, the d-axis current command and the q-axis current command are generated by using inductances of the d-axis and the q-axis corresponding to a value of a current that can be considered to flow through the synchronous motor by already output current commands of the d-axis and the q-axis.

Furthermore, for example, as described in Japanese Laid-open Patent Publication No. 2013-85407, there is a control method of performing control of maximum torque/current to adjust a current phase in order to prevent torque sag on a high-load side in a motor in which a difference exists between inductances of a d-axis direction and a q-axis direction, and accomplish torque improvement and miniaturization of the motor.

In a case of a permanent magnetic synchronous motor that does not have saliency, attractive force and repulsive force between a pole of a rotating magnetic field and a magnetic pole of a permanent magnet of a rotor generates magnet torque. When the number of pole pairs of the synchronous motor that does not have saliency is $P_n$, an interlinkage magnetic flux of the permanent magnet is $\Psi_a$, and a q-axis current that flows through an excitation-phase winding of the synchronous motor is $I_q$, magnet torque $T_M$ is expressed as in the equation 1.

$$T_M = P_n \times \Psi_a \times I_q \quad (1)$$

For an input torque command $T_{CMD}$, a q-axis current command $I_q^*$ is generated on the basis of the equation 2 obtained by modifying the equation 1, a d-axis current command $I_d^*$ is further generated from the q-axis current command $I_q^*$, and these q-axis current command $I_q^*$ and d-axis current command $I_d^*$ are used so that the synchronous motor that does not have saliency can be controlled.

$$I_q^* = \frac{T_{CMD}}{P_n \times \Psi_a} \quad (2)$$

In a case of a permanent magnetic synchronous motor having saliency, reluctance torque as well as magnet torque due to a permanent magnet is generated. The reluctance torque is torque generated by only attractive force between a pole by a rotating magnetic field of a stator and a salient pole of a rotor. In the synchronous motor having saliency, since a difference exists between a q-axis inductance and a d-axis inductance, torque increases by torque corresponding to reluctance torque when operation is performed by determining a d-axis current in accordance with the maximum current and an input voltage while a q-axis current is kept constant. When the number of pole pairs is $P_n$, a q-axis inductance is $L_q[H]$, a d-axis inductance is $L_d[H]$, a q-axis current flowing through an excitation-phase winding of the synchronous motor is $I_q[A]$, and a d-axis current is $I_d[A]$, reluctance torque $T_R[Nm]$ can be expressed as in the equation 3.

$$T_R = P_n \times (L_q - L_d) \times I_q \times I_d \quad (3)$$

Accordingly, torque $T[Nm]$ generated in the synchronous motor having saliency can be expressed as in the equation 4 by using the equation 1 and the equation 3.

$$\begin{aligned} T &= T_M + T_R \\ &= P_n \times \Psi_a \times I_q + P_n \times (L_q - L_d) \times I_q \times I_d \end{aligned} \quad (4)$$

FIG. 4 is a diagram illustrating relation between a speed and torque of the rotor when current vector control of the synchronous motor having saliency is performed by generating a q-axis current command and a d-axis current command by taking into account only magnet torque. When current vector control of the permanent magnetic synchronous motor having saliency is performed by generating a q-axis current command (and a d-axis current command) in accordance with the equation 2 that takes into account only magnet torque, torque T actually generated in the synchronous motor increases by reluctance torque $T_R$ from an input torque command $T_{CMD}$. Particularly, in a high speed region, torque increase by reluctance torque $T_R$ is outstanding. Even in this case, when a speed control loop is provided in the fore stage of a torque control loop, and a position control loop is provided in the fore stage of the speed control loop, a torque command is adjusted at the speed control loop in accordance with necessary torque. Accordingly, a position and a speed of the rotor of the synchronous motor can be accurately controlled. However, as described above, torque of the synchronous motor is unable to be controlled in line with a torque command, and an error is generated.

In order to avoid such a torque error, both magnet torque and reluctance torque are used to perform current vector control for the synchronous motor having saliency. In this case, for input torque command $T_{CMD}$, on the basis of the equation 5 obtained by modifying the equation 4, a q-axis current command $I_q^*$ is generated.

$$I_q^* = \frac{T_{CMD}}{P_n \times \{\Psi_a + (L_q - L_d) \times I_d\}} \quad (5)$$

FIG. 5 is a diagram illustrating relation between a speed and torque of the rotor when current vector control of the synchronous motor having saliency is performed by generating a q-axis current command and a d-axis current command by taking into account magnet torque and reluctance torque. Generating a q-axis current command $I_q^*$ in accordance with the equation 5 enables an input torque command $T_{CMD}$ to agree with torque T actually generated in the synchronous motor.

However, the equation 5 used for calculating a q-axis current command $I_q^*$ includes an actually-flowing d-axis current $I_d$, and a d-axis current command $I_d^*$ is acquired from a q-axis current command $I_q^*$ generated in accordance with the equation 5. For this reason, when a q-axis current command $I_q^*$ and a d-axis current command $I_d^*$ are attempted to be simply calculated, calculation of them is circulated. In order to avoid this circular reference, a value of d-axis current $I_d$ before latest one cycle is needed for calculating a q-axis current command $I_q^*$, and due to this, an error is still generated. Further, the equation 5 includes a division to which a load is applied for arithmetic processing, and therefore the process takes time.

SUMMARY OF THE INVENTION

In view of the above-described problems, an object of the present invention is to provide a motor control device that can generate, at a high speed, a q-axis current command and a d-axis current command used for controlling a synchronous motor having saliency, and can control torque with high accuracy.

In order to accomplish the above-mentioned object, a motor control device that generates a q-axis current command and a d-axis current command and that uses the commands to control a synchronous motor having saliency includes: a calculating unit calculating a speed reference value that takes, as an initial value, a value when a torque command is zero, and that decreases as a torque command increases; a determining unit determining magnitude relation between an input speed command and a speed reference value calculated for an input torque command by the calculating unit; a q-axis-current commanding unit that generates, when the determining unit determines that a speed command is smaller than a speed reference value, a q-axis current command of commanding a q-axis current to be flowed to the synchronous motor, on the basis of a torque command and an inverse number of a torque constant of the synchronous motor, and generates, when the determining unit determines that the speed command is equal to or larger than the speed reference value, a q-axis current command of commanding a q-axis current to be flowed to the synchronous motor, on the basis of a function of which independent variable is a speed command, the torque command, and the inverse number of the torque constant of the synchronous motor; and a d-axis-current commanding unit generating a d-axis current command of commanding a d-axis current that is made to flow to the synchronous motor, on the basis of a q-axis current command generated by the q-axis-current commanding unit.

The motor control device may further include a storing unit that stores a speed-reference-value initial value set as an initial value of a speed reference value when a torque command is zero, and stores a change ratio of a speed reference value used in a calculating process by the calculating unit.

When a speed reference value is $\omega_n$, a speed-reference-value initial value set as an initial value of a speed reference value when a torque command is zero is $\omega_0$, a change ratio of a speed reference value is k, and an input torque command is $T_{CMD}$, the calculating unit may calculate a speed reference value $\omega_n$ on the basis of the equation 6.

$$\omega_n = \omega_n - k \times T_{CMD} \quad (6)$$

When a q-axis current command of commanding a q-axis current that is made to flow to the synchronous motor is $I_q^*$, an input torque command is $T_{CMD}$, an input speed command is $\omega_{CMD}$, an inverse number of a torque constant of the synchronous motor is R, and coefficients are a, b, and c, when the determining unit determines that a speed command $\omega_{CMD}$ is smaller than a speed reference value $\omega_n$, the q-axis-current commanding unit may generate a q-axis current command $I_q^*$ on the basis of the equation 7, and when the determining unit determines that a speed command $\omega_{CMD}$ is equal to or larger than a speed reference value $\omega_n$, the q-axis-current commanding unit may generate a q-axis current command $I_q^*$ on the basis of the equation 8.

$$I_q^* = T_{CMD} \times R \quad (7)$$

$$I_q^* = T_{CMD} \times R \times (a\omega_{CMD}^2 + b\omega_{CMD} + C) \quad (8)$$

BRIEF DESCRIPTION OF THE DRAWINGS

The present invention will be more clearly understood by referring to the following attached drawings.

DETAILED DESCRIPTION

Figure 1:
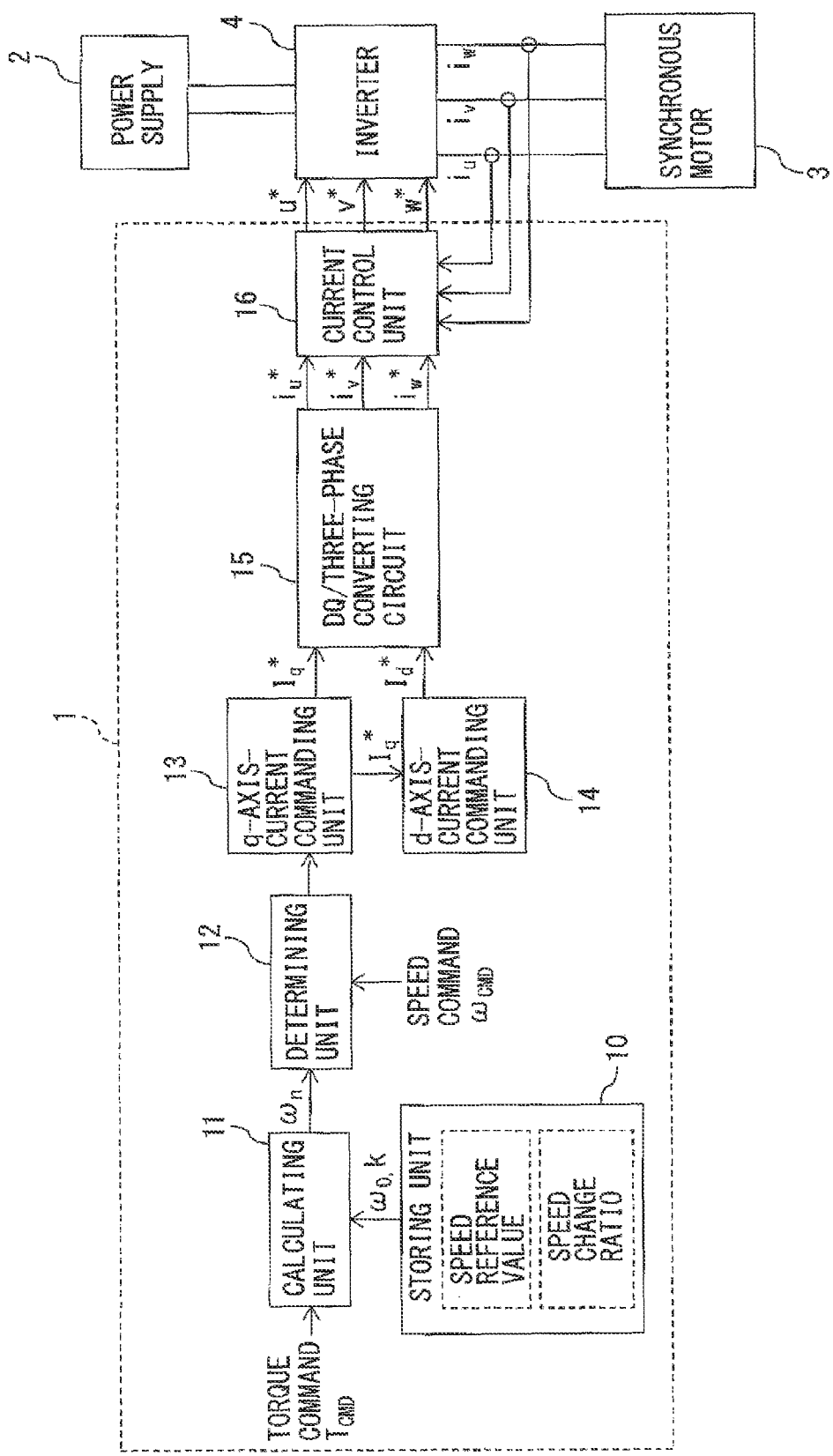
FIG. 1 is a principle block diagram of a motor control device according to an embodied example.

In the following, a motor control device controlling a synchronous motor is described with reference to the drawings. However, it is understood that the present invention is not limited to an embodiment illustrated in the drawings or described in the following.

FIG. 1 is a principle block diagram of a motor control device according to an embodied example. In the following, description is made about a case of using a motor control device 1 to control rotation of a three-phase alternating current (AC) synchronous motor 3 having saliency. Driving electric power for the synchronous motor 3 is supplied by an inverter 4. The inverter 4 is a power converting circuit, such as a PWM inverter, that includes semiconductor switching devices therein.

Switching operation of the semiconductor switching devices of the inverter 4 is controlled by switching commands u*, v*, and w* generated by the motor control device 1 so that the inverter 4 converts direct current (DC) power supplied from a power supply 2 into three-phase AC power of a desired voltage and a desired frequency for driving the three-phase AC synchronous motor 3 having saliency. Thereby, the synchronous motor 3 operates on the basis of the supplied voltage-variable and frequency-variable three-phase AC power. The power supply 2 that supplies DC power to the inverter 4 is constituted by a rectifier that converts three-phase AC power from a commercial three-phase AC power supply (not illustrated) into a direct current, for example. In the motor control device 1 according to the embodied example, a q-axis current command $I_q^*$ and a d-axis current command $I_d^*$ are generated by taking into account both of magnet torque and reluctance torque. As a calculation equation used for this generating process, a calculation equation that takes into account only magnet torque, and a calculation equation that takes into account both of magnet torque and reluctance torque are used selectively in accordance with a speed command $\omega_{CMD}$ that is a command for a rotational speed of the rotor of the synchronous motor 3. In other words, according to the embodied example, in accordance with a speed command $\omega_{CMD}$ that is a command for a rotational speed of the rotor of the synchronous motor 3, a calculation equation used for generating a q-axis current command $I_q^*$ is changed. Thereby, the synchronous motor 3 can actually generate torque that agrees with a torque command. Further, the calculation equations used for the generating process of a q-axis current command $I_q^*$ and a d-axis current command $I_d^*$ do not include division so that time taken for the arithmetic processing can be shorten, and a q-axis current command $I_q^*$ and a d-axis current command $I_d^*$ can be generated at a high speed. In order to generate such a q-axis current command $I_q^*$ and a d-axis current command $I_d^*$, the motor control device 1 includes a storing unit 10, a calculating unit 11, a determining unit 12, a q-axis-current commanding unit 13, and a d-axis-current commanding unit 14.

The calculating unit 11 calculates a speed reference value that is determination reference used in determining a q-axis current command $I_q^*$ to be generated. In other words, the calculating unit 11 generates a speed reference value $\omega_n$ on the basis of the equation 9. It is assumed that a speed reference value is $\omega_n$, a speed-reference-value initial value set as an initial value of a speed reference value when a torque command is zero is $\omega_0$, a change ratio of a speed reference value is k, and an input torque command is $T_{CMD}$.

$$\omega_n = \omega_0 - k \cdot T_{CMD} \qquad (9)$$

As expressed by the equation 9, a speed reference value $\omega_n$ takes, as an initial value, a value when a torque command $T_{CMD}$ is zero, and decreases as a torque command $T_{CMD}$ increases. The calculating unit 11 calculates a speed reference value $\omega_n$ for each input torque command $T_{CMD}$ on the basis of the equation 9. For example, on the assumption that a speed-reference-value initial value is $\omega_0=3000$ rpm, and a change ratio of a speed reference value is k=100, when an input torque command $T_{CMD}$ changes from 0 to 10, a speed reference value $\omega_n$ changes from 3000 rpm to 2000 rpm.

A speed-reference-value initial value $\omega_0$ and a change ratio k of a speed reference value may be set appropriately in accordance with characteristics and application of the synchronous motor 3. These set values are stored in the storing unit 10 provided in the motor control device 1.

The determining unit 12 determines magnitude relation between an input speed command $\omega_{CMD}$ and a speed reference value $\omega_n$ calculated by the calculating unit 11 for an input torque command $T_{CMD}$ in accordance with the equation 9. A result of the determination by the determining unit 12 is sent to the d-axis-current commanding unit 13.

The q-axis-current commanding unit 13 generates a q-axis current command on the basis of a determination result of the determining unit 12. It is assumed that a q-axis current command of commanding a q-axis current that is made to flow to the synchronous motor 3 is $I_q^*$, an input torque command is $T_{CMD}$, an input speed command is $\omega_{CMD}$, and an inverse number of a torque constant of the synchronous motor 3 is R. When the determining unit 12 determines that a speed command $\omega_{CMD}$ is smaller than a speed reference value $\omega_n$, the q-axis-current commanding unit 13 generates a q-axis current command $I_q^*$ on the basis of a torque command $T_{CMD}$ and the inverse number R of the torque constant of the synchronous motor 3. When the determining unit 12 determines that a speed command $\omega_{CMD}$ is equal to or larger than a speed reference value $\omega_n$, the q-axis-current commanding unit 13 generates a q-axis current command $I_q^*$ on the basis of a function whose independent variable is the speed command $\omega_{CMD}$ and on the basis of a torque command $T_{CMD}$ and the inverse number R of the torque constant of the synchronous motor 3. A case of using a quadratic function as the function whose independent variable is the speed command $\omega_{CMD}$ is described as one example as follows.

When the determining unit 12 determines that a speed command $\omega_{CMD}$ is smaller than a speed reference value $\omega_n$, the q-axis-current commanding unit 13 generates a q-axis current command $I_q^*$ by using the already-described equation 1 of magnet torque $T_M$. The torque constant of the synchronous motor 3 can be expressed by the equation: "the number $P_n$ of pole pairs×an interlinkage magnetic flux of the permanent magnet $\Psi_a$". The inverse number R thereof is calculated in advance to be stored in a storing unit (not illustrated) in the motor control device 1, so that this inverse number R is used at the time of the arithmetic processing. For an input torque command $T_{CMD}$, a q-axis current command $I_q^*$ for the case of a speed command $\omega_{CMD}$ smaller than a speed reference value $\omega_n$ is generated on the basis of the equation 10 obtained by modifying the equation 1. It is assumed that coefficients are a, b, and c.

$$I_q^* = T_{CMD} \times R \qquad (10)$$

Meanwhile, when the determining unit 12 determines that a speed command $\omega_{CMD}$ is equal to or larger than a speed reference value $\omega_n$, the q-axis-current commanding unit 13 generates a q-axis current command $I_q^*$ by using the equation 11.

$$I_q^* = T_{CMD} \times R \times (a\omega_{CMD}^2 + b\omega_{CMD} + C) \tag{11}$$

On the basis of a q-axis current command $I_q^*$ generated by the q-axis-current commanding unit 13, the d-axis-current commanding unit 14 generates a d-axis current command $I_d^*$ of commanding a d-axis current that is made to flow to the synchronous motor.

Thus, the equation used for generating a q-axis current command $I_q^*$ is changed in accordance with a speed command $\omega_{CMD}$ that is a command for a rotational speed of the rotor of the synchronous motor 3. Thereby, the synchronous motor 3 can actually generate torque agreeing with a torque command $T_{CMD}$. Further, the calculation equations used in the generating process of a q-axis current command $I_q^*$ and a d-axis current command $I_d^*$ do not include division and an item of circular reference about a d-axis current. Thereby, time taken for the arithmetic processing can be shortened, and a q-axis current command $I_q^*$ can be generated at a high speed.

A q-axis current command $I_q^*$ generated as described above and a d-axis current command $I_d^*$ of commanding a d-axis current are input to a DQ/three-phase converting circuit 15.

The DQ/three-phase converting circuit 15 converts a q-axis current command $I_q^*$ and a d-axis current command $I_d^*$ from a two phase to a three phase to generate current commands $i_u^*$, $i_v^*$, and $i_w^*$ for respective phases of a u-phase, a v-phase, and a w-phase of the synchronous motor 3.

The current controlling unit 16 generates switching commands u*, v*, and w* for causing currents $i_u$, $i_v$, and $i_w$ flowing through the excitation-phase windings of the synchronous motor 3 to follow three-phase current commands $i_u^*$, $i_v^*$, and $i_w^*$ output from the DQ/three-phase converting circuit 15. On the basis of the generated switching commands u*, v*, and w*, switching operation of the semiconductor switching devices of the inverter 4 is performed so that the inverter 4 converts a direct current from the power supply 2 into alternating currents, and supplies AC driving currents $i_u$, $i_v$, and $i_w$ to the windings of respective phases of the synchronous motor 3.

The calculating unit 11, the determining unit 12, the q-axis-current commanding unit 13, the d-axis current commanding unit 14, the DQ/three-phase converting circuit 15, and the current controlling unit 16 may be configured in the form of software programs, for example, or may be configured by combination of various types of electronic circuits and software programs. For example, when the calculating unit 11, the determining unit 12, the q-axis-current commanding unit 13, the d-axis current commanding unit 14, the DQ/three-phase converting circuit 15, and the current controlling unit 16 are configured in the form of software programs, an arithmetic processing device in the motor control device 1 operates in accordance with the software programs so that the functions of the above-described respective units are accomplished. An existing motor control device usually possesses the functions of the DQ/three-phase converting circuit 15 and the current controlling unit 16. In this motor control device, the software programs for the calculating unit 11, the determining unit 12, the q-axis-current commanding unit 13, and the d-axis-current commanding unit 14 can be additionally installed so that the present invention can be applied.

In the above-described embodied example, as one example, description is made about the case of adopting the open control loop that generates a q-axis current command $I_q^*$ and a d-axis current command $I_d^*$ on the basis of an input torque command $T_{CMD}$ and a speed command $\omega_{CMD}$. However, feedback control and feed forward control that uses a speed detection value and a position detection value about rotation of the rotor of the synchronous motor 3 may be added. For example, a position command for the rotor of the synchronous motor 3 is set as input, and the motor control device 1 may be provided with a position feedback control loop that generates a speed command $\omega_{CMD}$ from a position command and a position detection value of the rotor of the synchronous motor 3, and a speed feedback control loop that generates a torque command $T_{CMD}$ from a speed command $\omega_{CMD}$ and a position detection value of the rotor of the synchronous motor 3. Further, the motor control device 1 may be provided with a speed feed forward control system that is added to a speed feedback control loop in order to improve response to a speed command, and a position feed forward control system that is added to a position feedback control loop in order to improve response to a position command.

Figure 2:
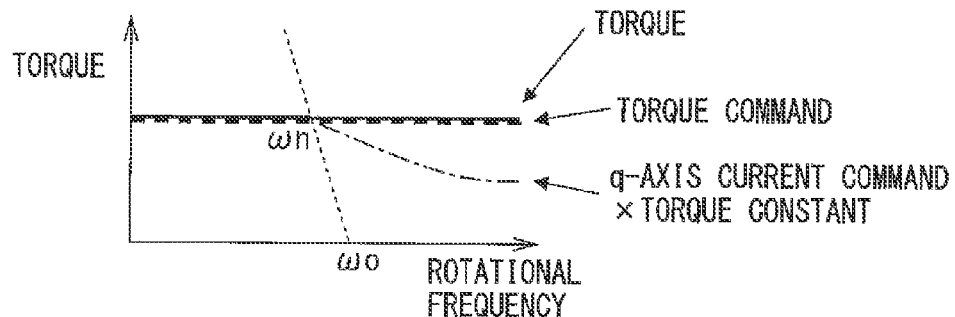
FIG. 2 is a diagram illustrating a relationship between a speed and torque of a rotor when current vector control of a synchronous motor having saliency is performed in the motor control device according to the embodied example.
Figure 4:
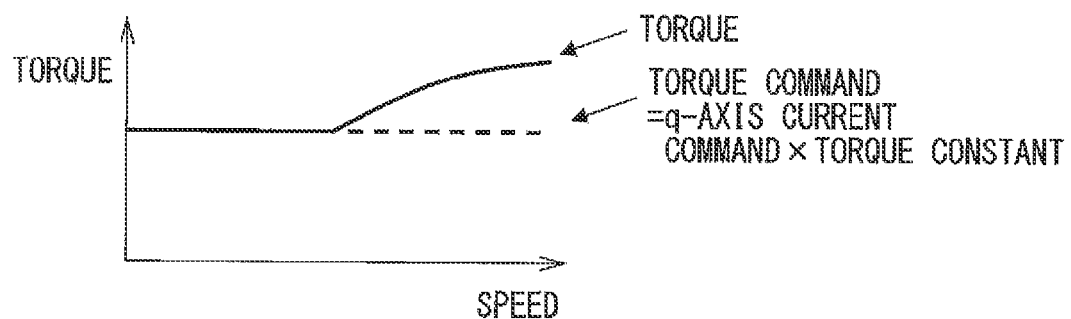
FIG. 4 is a diagram illustrating a relationship between a speed and torque of the rotor when current vector control of the synchronous motor having saliency is performed by generating a q-axis current command and a d-axis current command by taking into account only magnet torque.
Figure 5:
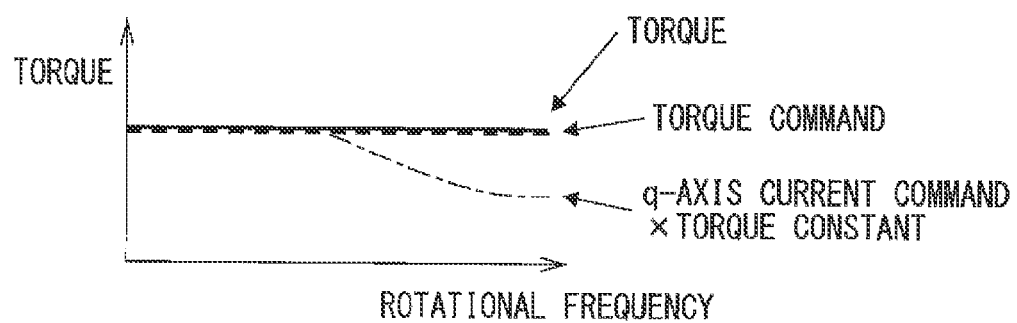
FIG. 5 is a diagram illustrating a relationship between a speed and torque of the rotor when current vector control of the synchronous motor having saliency is performed by generating a q-axis current command and a d-axis current command by taking into account magnet torque and reluctance torque.

FIG. 2 is a diagram illustrating relation between a speed and torque of the rotor when current vector control of the synchronous motor having saliency is performed by the motor control device according to the embodied example. FIG. 2 illustrates an example of a=1, b=1, and c=1 in the equation 11. It can be understood that torque increase by reluctance torque $T_R$ of the high speed region, which was generated in the prior art (FIG. 4), can be suppressed, and torque can be controlled with high accuracy.

Figure 3:
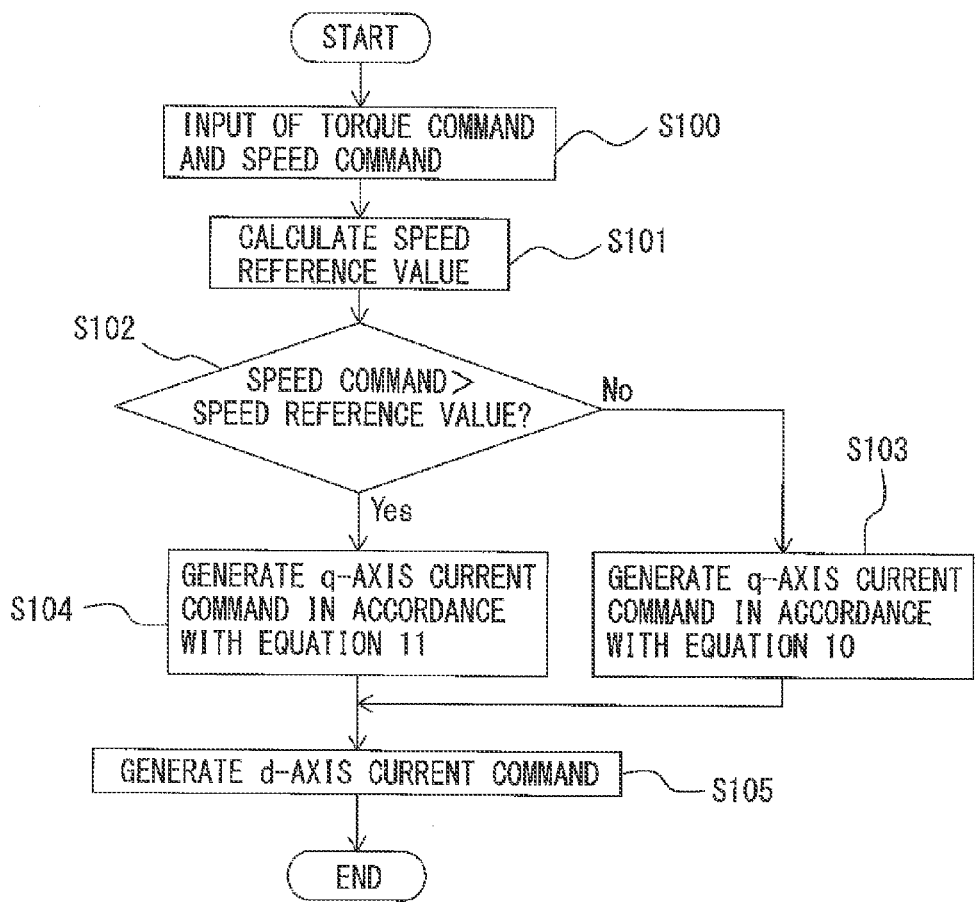
FIG. 3 is a flowchart illustrating an operation flow of the motor control device according to the embodied example.

FIG. 3 is a flowchart illustrating an operation flow of the motor control device according to the embodied example. First, when a torque command $T_{CMD}$ and a speed command $\omega_{CMD}$ are input at the step S100, the calculating unit 11 calculates a speed reference value $\omega_n$ on the basis of the equation 9 at the step S101.

Next, at the step S102, the determining unit 12 determines magnitude relation between the input speed command $\omega_{CMD}$ and the speed reference value $\omega_n$ calculated for the input torque command $T_{CMD}$ by the calculating unit 11 in accordance with the equation 9.

When it is determined at the step S102 that the speed command $\omega_{CMD}$ is smaller than the speed reference value $\omega_n$, the q-axis-current commanding unit 13 generates a q-axis current command $I_q^*$ on the basis of the equation 10 at the step S103.

When it is determined at the step S102 that the speed command $\omega_{CMD}$ is equal to or larger than the speed reference value $\omega_n$, the q-axis-current commanding unit 13 generates a q-axis current command $I_q^*$ on the basis of the equation 11 at the step S104.

Next, at the step S105, on the basis of the q-axis current command $I_q^*$ generated by the q-axis-current commanding unit 13, the d-axis-current commanding unit 14 generates a d-axis current command $I_d^*$ of commanding a d-axis current that is made to flow to the synchronous motor.

The present invention can be applied to a motor control device that controls a permanent magnetic synchronous motor (PMSM) having saliency such as an interior permanent magnetic synchronous motor (IPMSM).

According to the present invention, it is possible to accomplish a motor control device that can generate a q-axis current command and a d-axis current command used for controlling a synchronous motor having saliency at a high speed, and that can control torque with high accuracy.

In other words, an equation that takes into account only magnet torque, and an equation that takes into account both of magnet torque and reluctance torque are selectively used, as an equation used for a generating process of a q-axis current command and a d-axis current command, in accordance with a speed command that is a command for a rotational speed of a rotor of the synchronous motor. Accordingly, torque agreeing with a torque command can be generated in the synchronous motor, and torque can be controlled with high accuracy.

Further, the equations used for the generating processes of a q-axis current command and a d-axis current command do not include division and an item of circular reference about a d-axis current. For this reason, time taken for the arithmetic processing is shortened, and a q-axis current command and a d-axis current command can be generated at a high speed.

What is claimed is:

1. A motor control device that generates a q-axis current command and a d-axis current command, and uses the commands to control a synchronous motor having saliency, the motor control device comprising:
    a calculating unit calculating a speed reference value that takes an initial value when a torque command is zero, and that decreases as the torque command increases;
    a determining unit determining a magnitude relation between a speed command and the speed reference value calculated for the torque command by the calculating unit;
    a q-axis-current commanding unit that
        generates, when the determining unit determines that the speed command is smaller than the speed reference value, the q-axis current command of commanding a q-axis current to flow to the synchronous motor, on the basis of
        the torque command, and
        an inverse number of a torque constant of the synchronous motor, and
        generates, when the determining unit determines that the speed command is equal to or larger than the speed reference value, the q-axis current command of commanding the q-axis current to flow to the synchronous motor, on the basis of
        a function of which an independent variable is the speed command,
        the torque command, and
        the inverse number of the torque constant of the synchronous motor;
    a d-axis-current commanding unit generating the d-axis current command of commanding a d-axis current to flow to the synchronous motor, on the basis of the q-axis current command generated by the q-axis-current commanding unit; and
    an inverter configured to supply power to the synchronous motor in accordance with the q-axis-current command and the d-axis-current command,
    wherein
    the speed reference value is $\omega_n$,
    the initial value of the speed reference value when the torque command is zero is $\omega_0$,
    a change ratio of the speed reference value is k,
    the torque command is $T_{CMD}$, and
    the calculating unit calculates the speed reference value $\omega_n$ on the basis of the equation:
    $$\omega_n = \omega_0 - k \times T_{CMD}.$$

2. The motor control device according to claim 1, further comprising a storing unit storing the speed-reference-value initial value and the change ratio.

3. The motor control device according to claim 1, wherein the q-axis current command is $I_q^*$,
the speed command is $\omega_{CMD}$,
the inverse number of the torque constant of the synchronous motor is R, coefficients are a, b, and c,
when the determining unit determines that the speed command $\omega_{CMD}$ is smaller than the speed reference value $\omega_n$,
the q-axis-current commanding unit generates the q-axis current commanding $I_q^*$ on the basis of the equation:
$$I_q^* = T_{CMD} \times R$$
when the determining unit determines that the speed command $\omega_{CMD}$ is equal to or larger than the speed reference value $\omega_n$,
the q-axis-current commanding unit generates the q-axis current command $I_q^*$ on the basis of the equation:
$$I_q^* = T_{CMD} \times R \times (a\omega_{CMD}^2 + b\omega_{CMD} + c).$$

* * * * *